United States Patent [19]
Hida

[11] 4,109,398
[45] Aug. 29, 1978

[54] CONSTRUCTION TYPE EDUCATIONAL AND AMUSEMENT DEVICE
[75] Inventor: Hiroyuki Hida, Tokyo, Japan
[73] Assignee: Mitsubishi Pencil Co. Ltd., Tokyo, Japan
[21] Appl. No.: 714,354
[22] Filed: Aug. 16, 1976
[30] Foreign Application Priority Data
Aug. 16, 1975 [JP] Japan .................................. 50-99583
[51] Int. Cl.² .................... G09B 25/02; A63H 33/30; A63H 17/12
[52] U.S. Cl. ........................................... 35/13; 46/39
[58] Field of Search ................... 35/13, 18 A; 46/23, 46/24, 25, 26, 39, 206

[56] References Cited
U.S. PATENT DOCUMENTS

| | | | |
|---|---|---|---|
| 595,455 | 12/1897 | Glidden | 46/24 UX |
| 3,333,349 | 8/1967 | Brumlik | 35/18 A |
| 3,611,621 | 10/1971 | Folson | 46/25 |
| 3,624,939 | 12/1971 | Gossard | 46/24 X |
| 3,696,548 | 10/1972 | Teller | 46/25 |
| 3,961,440 | 6/1976 | Saito | 46/206 |

Primary Examiner—William H. Grieb
Attorney, Agent, or Firm—Otto John Munz

[57] ABSTRACT

A construction type educational and amusement device having as its basic element a generally spherical hollow module or capsule and adjuncts which may be interconnected and operatively assembled into a large number of different relations to form power-driven vehicles, cranes, propeller-driven floats, air propelled devices and many other assemblies of scientific interest. The capsules of a complete assembly may contain, respectively, an electric motor, gearing of various kinds and types, to form operative simulations. The modules are preferably of clear plastic so that operation may be observed and understood.

28 Claims, 26 Drawing Figures

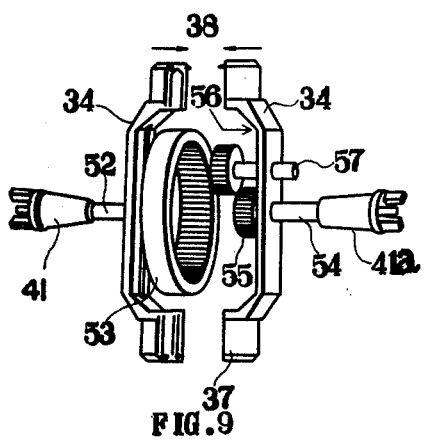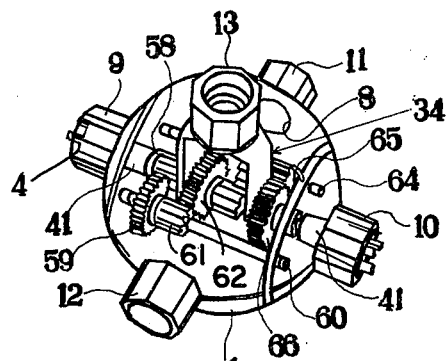

CONSTRUCTION TYPE EDUCATIONAL AND AMUSEMENT DEVICE

BACKGROUND OF THE INVENTION

This invention relates to a construction type assembly of units or components having as its basic element a module or capsule of generally spherical form and preferably of clear transparent or pellucid plastic. Each capsule may consist of two essentially identical hemispheres constructed to interfit at their equatorial planes to form a complete hollow sphere having integrally formed therewith two or more semicylindrical projections extending radially outwardly therefrom, with interfitting surfaces in the aforesaid plane. Thus when the hemispheres of any one capsule are interfitted and assembled to form a sphere, there are also formed two tubular radial projections extending in opposite directions with a common axis of symmetry in the equatorial plane. Each projection is preferably of regular polygonal form in external transverse section, for instance, an octagon having diametrically opposite apices disposed in the plane. Connecting sleeves are provided having an internal transverse section adapted to fit smoothly and snugly over and about each projection and of a length enabling any two selected capsules to be firmly interconnected by the insertion of a projection of each into the respective ends of a sleeve. The sleeves also act when in place, to firmly unite two mated hemispheres into a complete sphere. It should be noted that while the two hemispheres are substantially identical, they have rims which are complementarily rabbeted to interfit and to hold them in registration.

Each module may be formed with additional integral projections, for instance in a preferred form, a second pair divisible in the equatorial plane and defining an axis of symmetry normal to and intersecting the axis of the first pair. There may also be provided a third pair defining an axis mutually normal to and intersecting the axes of the first and second pairs. In the latter case, of course, each projection is complete and integral with its own hemisphere and thus not divisible into semicylinders as are the others.

By means of the aforesaid sleeves a number of the capsules may be interconnected and interattached in a wide variety of relations, to form any selected one of a number of functionally operative models. Further, due to the polygonal transverse section of the projections and the internal matching section of all sleeves, relative rotation between any two interconnected capsules about their common axis, is prevented.

In any given set a number of individual capsules may have mounted therein various mechanical and/or electrical elements such as an electric motor, reduction gearing of selected types, differential gears and other auxiliaries. These elements are operatively mounted in an unique but standardized way, by two axially-spaced semi-circular disks each fixed in its own hemisphere and having its diameter in the aforesaid equatorial plane symmetrically with and on opposite sides of a polar axis normal to the equatorial plane. The straight diametral edges of the two disks in each hemisphere are provided with bearing notches so that when two such hemispheres are mated the registering notches form closed bearing openings in which shafts may be journaled. For instance each pair of registering notches may form a central bearing aperture coaxial with the axis of its projections, and two other bearing apertures spaced equally on opposite sides of the central aperture.

Where a capsule is to journal other shafts normal to the one mounted by the aforesaid disks, special cages are provided, one removably fitting each hemisphere and conjointly affording bearing apertures for such other shafts. Except for the capsule incorporating an electric motor or other power-driven element, all of the mechanical elements mounted within a capsule may be easily and quickly removed when two hemispheres are separated, and as easily reassembled in the same or another capsule. In certain constructions an open frame is provided with opposed trunnions which may be journaled in the respective opposed cylindrical openings in a pair of projections. Such a frame, having bearing apertures in its sides, is useful in mounting the inner ends of short shafts where it is necessary to avoid interference with other shafting extending diametrically acoss the capsule. Such a frame may itself be divisible in two identical parts divided in a plane through the common axis of the trunnions.

Other adjuncts such as vehicle wheels, tire treads, floats, battery housing, control box and items simulating machines such as lifting cranes, winches, etc. are provided as will be clear from the detailed description following.

It is therefore the principal object of this invention to provide an educational and amusement device having outstanding features of interchangeability by which a relatively small number of component parts may be combined and united to form a wide variety of power trains or combinations which accurately simulate power-driven and operated machinery in actual use, such as motor-driven tractors, trucks, caterpillar tractors, paddle-wheel and propeller-driven floats, cranes and lifting devices.

Among the more important auxiliary objects are, to provide a construction type combination of elements or components which is highly entertaining and instructive to young and old alike, which facilitates understanding of the construction and operation of mechanical and electrical machinery, and which stimulates and develops the creative instinct of all, in particular, youths.

Other objects and advantages of the invention will be clear to those skilled in the art, after a study of the following description in connection with the accompanying drawing.

BRIEF DESCRIPTION OF THE DRAWING

FIG. 9 is an exploded perspective of a second form of gearing which may be optionally installed in any capsule or module;

FIG. 10 is a perspective of a gear train having a high reduction ratio and assembled and installed in its capsule;

FIG. 11 is a detail partly in section, showing how two coaxial shafts are journaled in one bearing;

FIG. 12 is a perspective showing one of the capsules with an electric motor operatively mounted therein;

FIG. 13 shows a capsule incorporating a circuit closer or flasher;

FIG. 14 is a partial view showing how four identical float attachments may be connected with one capsule for creating a water-borne assembly;

DESCRIPTION OF THE PREFERRED EMBODIMENTS

Figure 1:
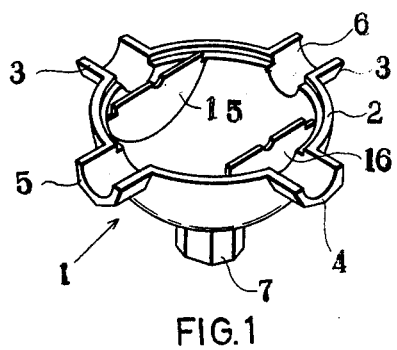
FIG. 1 is a perspective view showing one hemispherical half of a capsule or module of general utility.
Figure 3:
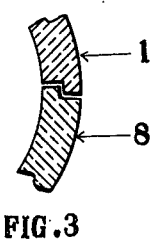
FIG. 3 is a radial section through the equatorial plane of two mated halves or hemispheres, showing their complementarily rabbeted rims.

Referring in particular to FIG. 1, 1 identifies generally a hemispherical half of one module or capsule, preferable constructed of clear pellucid plastic and which may be tinted. The circular rim 2 defines an equatorial plane of the module and may be rabbeted as shown to an enlarged scale upon FIG. 3. A first pair of aligned semicylindrical projections 3 and 4 are integral with part 1 and extend radially outwardly therefrom at respective ends of a first diameter in the aforesaid plane. A second pair of like projections 5 and 6 extend outwardly from part 1 and as is clear from the figure, define a second diameter in the plane and normal to the first one. Another projection 7 complete per se, extends radially outwardly at and along a polar axis normal to and centrally intersecting the equatorial plane.

Figure 2:
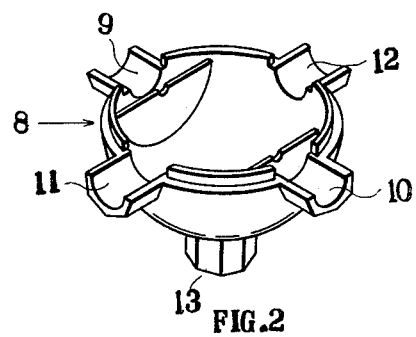
FIG. 2 is a perspective of the second or matching half of the item of FIG. 1.

The complementary hemisphere of FIG. 2 is of essentially the same shape and form as that of FIG. 1 so that it is sufficient to identify projections 9, 10 defining a first axis, 11 and 12 defining a second axis normal to the first one and both in the equatorial plane, and another complete projection 13 disposed along a polar axis normal to the equatorial planc. Each projection is formed integrally with its hemisphere. To give a general idea of the size and proportions of the modules, the assembled sphere may have an outside diameter of the order of two inches. Of course greater or smaller dimensions are contemplated and practicably useful.

Thus when halves 1 and 8 have been properly matched a complete sphere is formed wherein each respective pair of projections 3, 9; 4, 10; 5, 12; and 6, 11 forms a tubular cylinder. All projections are preferably of the same size and axial dimension and in transverse section are, externally, in the form of a regular octagon while truly cylindrical internally. Where the external form is octagonal it is so angularly disposed that two diametrically opposite apices lie in the equatorial plane. The octagonal sections of projections 7 and 13 will then be so disposed that two diametrically opposed apices of each will be in a plane passing through their common axis, normal to the equatorial plane.

Figure 4:
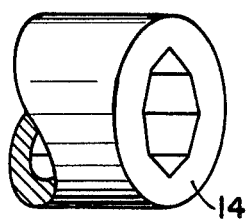
FIG. 4 is a perspective of one of two or more sleeves by which the hemispheres such as those shown at FIGS. 1 and 2 may be firmly but detachably interconnected in correct mating relation.

FIG. 4 shows at 14 one of a number of identical connector sleeves which may likewise be of clear plastic. The sleeve is formed to have an internal transverse section sized and shaped to fit over and about any of the matched or mated pairs of projections previously identified, as well as over projections 7 and 13. Thus when halves 1 and 8 are mated as previously described and a sleeve 14 is slipped over 3 and 9 and another over 4 and 10, the hemispherical shells are firmly and positively united in proper sphere-forming relation. Of course other sleeves may be slipped over pairs 5, 12 and 6, 11, respectively and whenever desired, over either or both projections 7 and 13. Each sleeve has about twice the axial dimension of any one projection so that two modules may be united by inserting a projection of each into the respective ends of a sleeve, with their free ends contiguous.

As subsequently explained, some hemispheres contain mechanical and electrical parts or elements such as shafts bearing intermeshing gears. For journaling such shafts, semi-circular disks are fixed internally of each half. Thus, referring to FIGS. 1 and 5, these semi-circular disks are identified respectively at 15 and 16 where it will be noted that each is rigidly attached with its arcuate edge cemented or otherwise secured to and in contact with the interior surface of the hemisphere and with its straight diametral edge in the equatorial plane, so that the two are symmetrical with respect to and upon opposite sides of the polar axis. For a secure and lasting attachment the arcuate edges are beveled as indicated at 20, FIG. 5, to have surface to surface contact with the hemisphere. Also noted is the fact that the straight diametral edges of disks 15 and 16 are provided with semi-circular notches such as 17, 18 and 19 for disk 15, noting FIG. 5.

Figure 5:
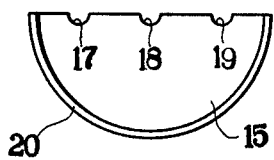
FIG. 5 is an elevation to an enlarged scale of one of the two mounting disks fixed interiorly within some or all of the modules.

As all disks are of the same size and similarly notched, when two hemishperical halves are joined in mating relation the straight diametral edges of the opposed pairs of disks are substantially contiguous and in registration so that the notches therein conjointly form three cirular bearing apertures, as is clear from inspection of FIGS. 1, 2 and 5. Thus when a module formed by two properly-joined hemispheres is to contain mechanical elements such as gearing, and are detached, it is simple to assemble such gearing by emplacing the ends of the gear shafts into the appropriate notches. Then the second hemisphere is positioned in mating relation and the shafts and gearing are rotatably held and journaled in operating positions.

Figure 6:
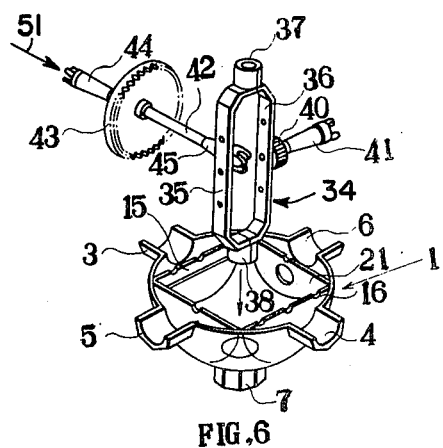
FIG. 6 is an exploded perspective showing how a standard capsule or module is equipped with bevel gearing.

FIG. 6 shows how a spherical module is provided with 90° bevel gearing. Here, in addition to disks 15 and 16 there is also provided a one-piece cage 21 shown in perpective and to an enlarged scale upon FIG. 7. This cage is not attached to its hemisphere but is sized and shaped for a smooth accurate fit within it. It is essentially a hemisphere with four flat truncated sides 22, 23, 24 and 25, in 90° relation. Sides 22 and 24 have an accurate surface-to-surface fit against semi-circular disks 15 and 16, respectively, and are cut away as shown at 26 for side 24. Also note FIG. 6. This is for the purpose of avoiding interference with shafts journaled in bearing notches 17, 18, 19, etc., as the case may be. Lightening holes 27 and 28 are formed in sides 23 and 25, and a larger hole 29 is formed in the cage, coaxial of the aforesaid polar axis. The diameter of this hole is not critical so long as it is larger than the interior diameter of projection 7 and does not prevent a smooth and accurate fit of the cage within its hemishpere.

It will be understood that a second cage identical with item 21 is provided to fit within hemisphere 8; and when the hemispheres are united, edges 30 and 31 of truncated surfaces 23 and 25 are in registration with the corresponding edges of the second cage and thus form bearing apertures conjointly with the notches of the contacting or registering edges of the second cage.

Returning to FIG. 6, an open frame 34 has parallel elongated sides 35 and 36 united at top and bottom by coaxial trunnions 37, 38. These trunnions are dimensioned for a smooth bearing fit within the cylindrical bores in projections 7 and 13, respectively. The dimensions are such that when halves 1 and 8 are interfitted, the frame is journaled for smooth, accurate pivoting about the polar axis, that is, the common axis of projections 7 and 13. Also noted is that the frame is or may be formed in two identical halves which may be separated in the disassembled form, or alternatively cemented together as shown. Sides 35 and 36 are pierced with three regularly-spaced openings. The central pair of these are in alignment with the common axis of projections 5, 12 and 6, 11, in the assembled module.

Figure 7:
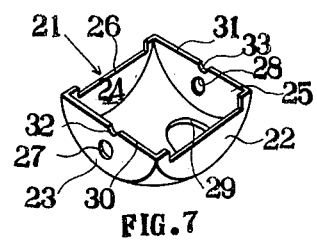
FIG. 7 is a perspective view to an enlarged scale showing one of the two duplicate shaft-supporting cages used in some modules.
Figure 8:
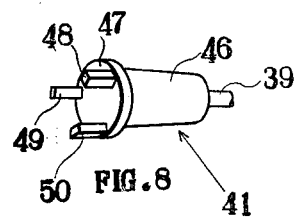
FIG. 8 is a perspective view to an enlarged scale, of one of a number of shaft couplings.

In the particular bevel gearing of FIG. 6 there is a metal shaft 39, FIG. 8, with one end journaled in a central aperture in side 36. A pinion 40 and a coupling 41 both of which may be of rigid plastic, are fixed to the shaft in axially spaced relation for an accurate fit in notch 33, FIG. 7. Another metal shaft 42 has couplings 44 and 45 secured to its respective ends and a ring gear 43 is disposed between them, also fixed to the shaft. The dimensions are such that in assembled relation shaft 42 is journaled in the central bearing apertures such as 18, FIG. 5, conjointly formed between disk 15 and its related disk fitting in half 8, and between disk 16 and its related disk in the same hemisphere 8. Thus the shaft is mounted coaxially of the common central axis of matching projections 3, 9 and 4, 10.

FIG. 8 shows one of the shaft couplers such as 41, all of which are preferably alike. This coupler, fixed on shaft 39, has a frustoconical base 46 terminating in a cylindrical disk-like bearing or base 47 and from which extend three axially-disposed, equiangularly-spaced prongs 48, 49 and 50. The entire coupler may be in one piece and of rigid plastic. The dimensions are such that in the assembled relation, disk 47 has a smooth bearing fit in the cylindrical bore conjointly formed by mating projections 6 and 11, while the ends of the prongs project beyond the outer terminus of the projections. Thus when a sleeve 14 is slipped over the mating projections to hold them united, and another projection of a second module journaling a second coupler is inserted into its second end, the prongs of the two couplers intermesh and thus positively but separably connect the shafts in the associated modules. The connection is effected automatically merely by insertion of the two projections into the ends of any one of the duplicate sleeves 14.

Assembly of the module of FIG. 6 is very simple. With lower cage 21 in place in shell 1, frame 34 is held in about the position shown and the end of shaft 39 is inserted into the central bearing hole as shown. One end of shaft 42 with its coupler 45 is passed through the open frame as indicated by arrow 51 and the parts are lowered together until trunnion 38 is journaled in the bore of projection 7. Then the second cage like 21 is lowered until its edges register with edges 30 and 31 respectively, and its notches fit over shaft 42 to complete the bearings therefor. Next the hemishperical shell 8 is lowered into position until its circular rabbeted equatorial edge mates with that of shell 1. Then a pair of sleeves 14 may be slid over the matching semi-cylindrical projections to hold the halves united and to complete the module. In the assembled relation gear 43 is in mesh with pinion 40. Rotation of any coupler, such as 41, from an external source effects corresponding rotation of shafts 39, pinion 40, gear 43, shaft 42 and its couplings 44 and 45. The gear ratio may be selected as desired. In fact it is contemplated that other shafts like 39 and 42 may be provided equipped with meshing gears of selected but differing pitch diameter ratios.

Other kinds and types of gearing may be provided for use in the same or different modules like 1 and 8. FIG. 9 shows a useful and instructive form of internal reduction and reversing gearing which may be used alone or in conjuction with a module such as that of FIG. 6. In this figure it will be understood that the hemispherical shells are omitted for clarity of illustration. However in this particular module, cages like 21, FIG. 7, are not required.

The frame used in FIG. 9 may be identical with item 34, FIG. 6, being shown in two separate parts for better illustration of the gears. One shaft 52 has a coupler 41 secured to its outer end, and an internal gear 53 attached to its inner end. The shaft is journaled in the central bearing opening of one side of the frame. A second shaft 54 is journaled in the central bearing of the other side of the frame, and has a coupler 41a and a pinion 55 secured to its respective ends. A reversing pinion 56 is fixed to one end of stub shaft 57 journaled in one end bearing of the frame and, in the assembled module, meshes with both gear 53 and pinion 55. In a way clear from the figure, when one coupler 41a is rotated the opposite coupler is turned at a reduced rate depending upon the gear ratios selected and the directions of rotation are reversed. The parts shown upon FIG. 9 may be assembled into any spherical shell such as is conjointly formed by parts 1 and 8, merely by dropping united trunnios 37 and 38 into projections 5 and 6 and shafts 52 and 54 into the central bearing notches in disks 15 and 16, then emplacing shell 8 over shell 1 so that the bearing disks such as 47, FIG. 8, are confined in the respective mating pairs of projections 5, 12 and 6, 11, while shafts 552 and 54 are confined in and between the central notches of discs 15 and 16. The axial distance between the couplers at the ends of shafts 52 and 54 is about equal to the separation of disks 15 and 16 so that end play of the shafts is prevented.

FIG. 10 shows in perspective an assembled module embodying a high-ratio reduction gearing usefully employable in mechanical connection with modules previously described. This module comprises interengaged hemispherical shells such as 1 and 8 with their projections and two pairs of internal fixed semicircular disks like 15 and 16, FIG. 1. As shown, the straight diametral edges of each pair are in registration and conjointly form three bearing apertures, noting FIG. 5. A frame 34 as in FIG. 6, has its trunnions journaled in the respective bores of projections 13 and 7, the latter being concealed upon FIG. 10. Projection 9 houses a coupler 41 fixed to a relatively short or stub shaft 62a, FIG. 11, carrying a pinion 58 fixed therewith. The inner end of this shaft is journaled in the central bearing aperture in one side of frame 34 but occupies only about one-half of the axial dimension thereof. The shaft is also journaled in a central bearing such as 18, FIG. 5. For this purpose there is a small spacing between pinion 58 and the adjacent or inner end of coupler 41 so that the shaft is thereby substantially fixed against axial play.

Pinion 58 meshes with a gear 59 fixed on shaft 60 which is journaled in an aligned pair of bearing apertures in disks 15, 16, etc. This shaft also has a pinion 61 fixed thereto. In turn, pinion 61 meshes with larger gear 62 mounted upon an idler shaft 63, FIG. 11, but having its ends journaled in the central holes of the two sides of frame 34. For instance the ends of the shafts bearing pinion 58 and gear 62 are contiguous within the central bearing hole of one side of the frame. The construction is made clear by FIG. 11 where, as shown, the second end of shaft 63 is journaled in one-half of the central hole or aperture in the other side of frame 34. A pinion fixed on this shaft meshes with a gear like 59, fixed to a shaft journaled at its ends in the disks such for instance as 19, FIG. 5. A pinion 65 also fixed to this shaft meshes with the final gear 66 mounted on a stub shaft having its inner end journaled in a central hole in one side 36 of frame 34 and its outer end mounted in the central hole, jointly formed by disk 16, FIG. 1, and its related disk, in the manner previously described. A coupler 41 is fixed to the end of the shaft so that its prongs protrude from projection 10. Shaft 60 and gears 59, 61 thereon may be a duplicate item of shaft 64 and its gears, so that the two shafts are interchangeable. The gear train thus formed has a large ratio of about 28:1 and is useful for instance, where a model of a tractor or caterpillar is to be driven at reasonable speed by an electric motor.

Such a motor is indicated at 67, FIG. 12, where the top hemishperical shell such as 8, has been omitted to more clearly show internal parts. This module contains two complemental cages like the one described in connection with FIG. 7. The axial dimension of the motor casing is about equal to the distance between two opposite sides of the cage and thus has a smooth fit between them. One projecting end of the motor shaft carries a coupler 41 while the other end, projecting to a lesser extent, is journaled in matched bearing notches such as 32, FIG. 7, formed conjointly by the cages, as previously described. The coupler may also be journaled by means of its disk-like base 47, FIG. 8, in the cylindrical bore of mated projections 6 and 11, FIGS. 1 and 2. Insulating bushings 70 and 71 have a snug fit in the bores formed by projections 4, 10 and 5, 12, respectively, and are staked as at 72 against axial and rotational movement. The two bushings are identical and each has an exposed central cavity into which a metal plug of a conductor may be inserted as is clear for bushing 71, FIG. 12. Each cavity is metal-lined and electrically connected to a respective one of two leads to the motor. When the top shell is fitted down over the lower one as previously described, this module of FIG. 12 may be connected by any one of sleeves 14, to intermesh the prongs of its coupler with those of any other module such as the one identified at 41, FIG. 6. Three other of its projections are useful in the attachment of other modules either empty of containing mechanized or motor-driven parts.

FIG. 13 shows a capsule with upper hemispherical half removed, and embodying a circuit closer. Since the sphere per se may be as shown upon FIGS. 1 and 2, it will be clear that a shaft 73 has couplers 41 secured to its ends. These journal the shaft by means of their bases like 47 as previously explained in connection with FIG. 8. A wheel 74 of dielectric material is secured on the shaft for rotation therewith. The wheel has a circular metallic plate 75 fixed to one of its faces coaxially with the shaft. First and second generally cylindrical connectors 76 and 77 are of dielectric material. Connector 77 is shown elevated out of its projection 6, for better illustration; and since the two items are identically constructed, a description of item 77 will be sufficient. A metallic blade 78 is potted in the plastic of the connector, to extend therealong and at its outer end is in contact with a small receptacle (see item 79, FIG. 13) to receive a plug at the end of a flexible wire or connector, not shown. The inner end of the blade is forked to provide resilient tines which in the assembled relation press against plate 75 to, at times, make electrical contact therewith.

Adjacent to its rim, wheel 74 carries arcuate cams of dielectric material. The two cams are shown as diametrically opposite although this is not a necessity. These cams or lifters identified at 79a and 80, FIG. 13, are so dimensioned that when on rotation of the shaft, either one moves into contact with one of the blades, it lifts the latter out of contact with plate 75. Otherwise a circuit is completed including socket 79, blade 81, plate 75, blade 78 and the socket, not shown, in the outer end of connector 77. When on rotation of the shaft and wheel, one of the cams passes beneath the resilient tines of either blade, the tines are moved axially so that their ends are shifted out of contact with plate 75 thus interrupting the previously-described circuit. The circuit may include lamps, relays, solenoids, motor circuits or in fact any other component.

It should here be pointed out that the duplicate capsules or spheres are useful per se merely as connectors between two or more other capsules, as where a certain over-all length of an assembly is to be increased. In such cases it is not necessary that the capsule or capsules contain mechanical or electrical parts. They may be empty but nevertheless are useful. Capsules whether or not they contain mechanical or electrical operating parts are useful for the attachment of float elements in a certain selected relation.

Figure 15:
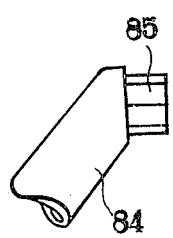
FIG. 15 is a detail showing a feature of the connection of each float to a capsule.

Thus in any selected group of components there may included four floats and used as in FIG. 14, as well as in numerous other ways, individually or in combination. Each of the floats such as 82, FIG. 14, may consist of metal or synthetic plastic including a hollow bulb 83 shown for the purpose of illustration as generally spherical and about 2½ inches in diameter, and an integral tubular neck 84 terminating in a short extension 85 polygonal in transverse section to fit snugly within an end of a sleeve like 14, FIG. 4, and thus firmly connect them in fixed relation with any spherical capsule as will be clear from FIG. 14. FIG. 15 shows that the angle between the axes of symmetry of the neck 84 and extension 85 is about 120° although the exact angular value is not critical. The faces of the extension are disposed angularly about the axis thereof so that when it is inserted into a sleeve already connected to a capsule, the longitudinal axis of neck 84 is coplanar with the polar axis of the capsule.

FIG. 14 also shows how a capsule containing a motor 67 as in FIG. 12 or gearing as in FIG. 10 for example, may be attached and supported by four floats either on a solid surface or in liquid. Also illustrated is the way in which current may be led to the motor-containing capsule through a lead 86 passing upwardly through the sphere to one socket terminal of the motor.

It is one of the very important features of the invention that its component parts may be assembled to create an almost unlimited number of useful, instructive and entertaining mechanical and electrical parts and combinations. One of these is shown upon FIG. 16 in the form of a four-wheel motor-driven vehicle. Forward capsule "A" contains a motor which may be an item like 67, FIG. 12. Next in order is capsule "B" embodying the reducing gear train of FIG. 10, to which is attached a capsule internally mounting wheel-connected bevel gearing as shown in FIG. 6. The capsules are attached in alignment by sleeves 14, with couplers 41 of A and B in mesh. Capsule A is mounted by wheels 87, 88 which are shown with treads such as 89 in the form of readily detachable resilient rubber bands held in place by rims or flanges outstanding from each side of the plastic wheels. Each wheel has a central hole 90 sized for a smooth fit over a threaded lug 91 integral with a flange 92 and likewise attached at its inner end to a coupler 41. A plug 93 has its inner end externally shaped polygonally to fit within sleeve 14. Its outer end is flanged as at 94, in face-to-face contact with flange 92. Thus in a way clear from the figure, when wheel 88 is slipped over lug 91 and a flanged retaining nut 95 is threaded onto the lug, the wheel is firmly and rotatably mounted when one end of sleeve 14 is slipped over the projection of the capsule and plug 93 is inserted into its other end. Wheel 87 is journaled to capsule A in an identical way. Where an eccentric wheel axle is desired, lug 91 may be passed through any one of a number of radially offset holes such as 96 in the flange of wheel 88. It is important to note that in the assembly, wheel 88, nut 95, lug 91, flange 92 and coupler 41 rotate as a unit by the journal bearing in plug 93 and its integral flange 94, both of which are fixed with respect to the capsule.

Coupler 41 of the motor shaft extends into a sleeve wherein it is coupled with the input shaft of capsule B when projection 9, FIG. 10, is inserted into the other end of the sleeve. Then when projection 10 of FIG. 10 is inserted into one and of another sleeve, its coupler engages with that of capsule C and a driving reducing gear train is completed from motor 67 to driving wheels 87 and 88. These wheels are like 96 and 97 and are similarly mounted by like parts such that the two couplers thereof mesh with couplers 44 and 45 respectively, as shown upon FIG. 16. Also see FIG. 6. Thus in an obvious way, when the motor is energized, wheels 96 and 97 are rotated at a reduced rate, to propel the vehicle. Wheels 87 and 88 merely idle in such a drive since their couplers 41 are not in mesh with anything in capsule A.

Figure 16:
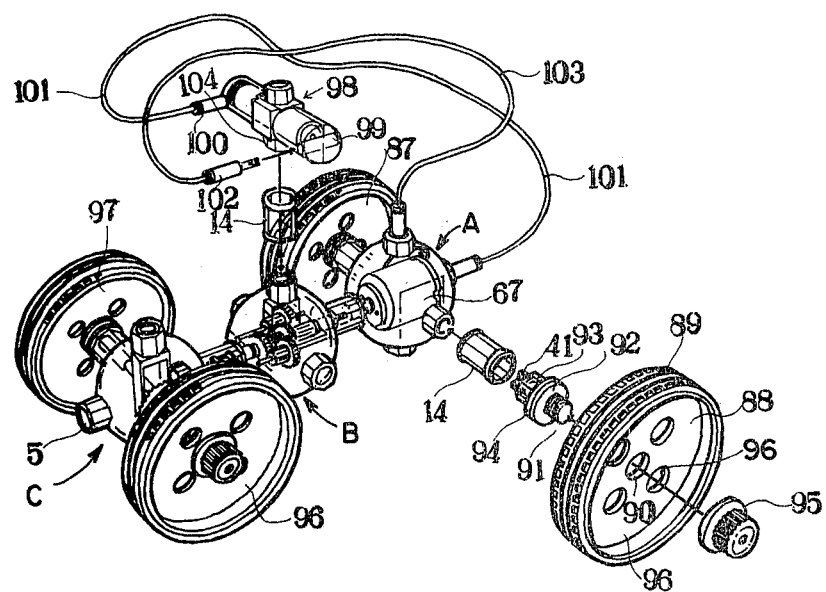
FIG. 16 is a perspective view partly exploded, showing one of the great many ways in which the component parts may be usefully and educationally assembled, in this case a motor-propelled four-wheel vehicle.

A very convenient way of supplying power to motor 67 is also shown upon FIG. 16 and is useful in all built-up structures or combination embodying a power drive. The generally cylindrical housing 98 contains a dry cell. It is formed in two halves which are essentially duplicates and of dielectric material. The halves are as shown separable in a vertical axial and diametral plane. When they are united they are held by the insertion of a lower projection 104 which they conjointly form, into one end of a sleeve 14. When the other or lower end of the sleeve is slipped over projection 13, FIG. 10, of capsule B the housing and its battery are firmly supported upon the vehicle.

A pair of hollow or tubular contact pins such as the one indicated at 99, extend diametrically across the housing interiorly at the respective ends thereof. Each pin is fixed in the bore of one half of the housing and slidably fits in the corresponding bore of the other half so that the halves may readily separated when in the detached position shown at FIG. 16. A coil spring not shown, positioned within the housing, contacts one pin and the metallic base of a dry cell, while urging the cell axially with its central contact against the other pin. The pins are tubular and sized to receive plugs 100, 102, each fixed respectively, with one end of flexible leads such as 101 and 103. Contact pin 102 is clearly shown on FIG. 16, which makes it clear how motor 67 is energized from the cell in housing 98 when pin 102 is moved into frictional engagement in the hollow pin 99, it being understood that the plugs of the leads at the motor ends are seated in contacts 71 and 70, respectively, FIG. 12.

Figure 17:
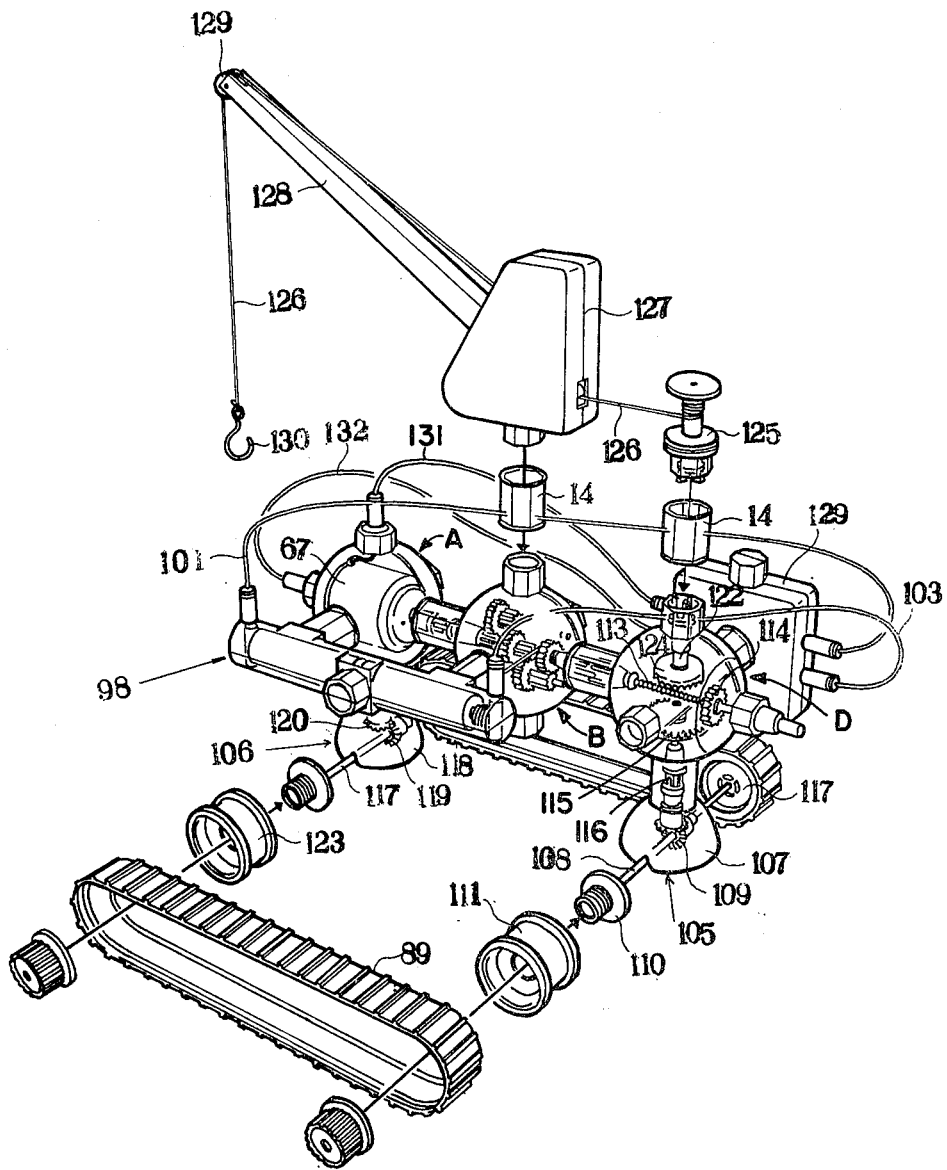
FIG. 17 is a partially exploded perspective showing how the modules or capsules are united with other parts to simulate an operative power-driven caterpillar tractor.

A very useful adjunct is a switch box 129, FIG. 17, by which the motor or other circuits may be controlled while leaving place all plugs of the conductors or leads such as 101 and 103. This box may be generally parallelepipedal in form and have one or more projections shaped to enter one end of any sleeve. If two projections are provided they will preferably be in alignment and extend from opposite faces of the box. Other such projections may be formed integrally with the material of the box, which will also incorporate first and second pairs of plug-in sockets with each pair being located in two opposed faces respectively. A toggle switch extends from a side of the box which is unobstructed by projections. The inside wiring is such that when the ends of motor leads such as 101, 103, FIG. 16, are plugged into a first pair of sockets of the box, instead of into the battery housing, and the ends of the second pair of conductors or leads are plugged into the second pair of sockets, respectively in the box and sockets of the battery housing, the toggle switch may be used to energize and de-energize the motor or for that matter, any other electrically energized item with which it may be wired.

FIG. 17 shows how the capsules and related adjuncts may be combined to mechanically simulate a caterpillar or crawling tractor. For this purpose there are provided two identical axle mounts such as 105, 106. Each mount consists of a simple hemispherical shell of transparent plastic such as 107 having a projection like 13, FIG. 10, extending upwardly from its center point and adapted to fit with good friction, into the end of any sleeve 14. A short shaft not shown, with bevel gear 109 fixed to its lower end and a coupling 14 secured to the other, is journaled as shown upon FIG. 12 for coupling 41.

The rim of shell 107 is notched at diametrically opposite points to receive with a snap-on or friction grip, a metal shaft 108. Two duplicate threaded disc-like wheel mountings one of which is shown at 110, are fixedly secured to the respective ends of shaft 108 so that in a way clear from inspection of the figure a wheel 111 can be secured to the shaft by passing its central hole over the threads on mounting 110 and turning on a retaining nut which may be the same or a duplicate of item 95, FIG. 16. The other wheel is identified at 117 and need not be described in detail since it is a duplicate of item 111 and similarly fixed to the other end of its shaft 108.

The chassis of the vehicle is made up of three capsules A, B and D of which A and B may be identical with those similarly identified upon FIG. 16. In a way described for shaft 42 in connection with FIG. 6, capsule D journals a worm shaft 113 aligned with and coupled to the power output of capsule B as described in detail in connection with FIG. 10. At the other end of the shaft there is fixed a gear 114 meshing with a crown gear 115 fixed to the upper end of a short shaft journaled in the lower downward projection of capsule D and coupled at 116 to rotate about a vertical axis, a bevel gear in mesh with bevel gear 109, previously described. Thus the speed of motor 67 in capsule A is greatly reduced in capsule D so that driving shaft 108 and its wheels are given a relatively slow rotation. Forward shaft 117a is mounted for rotation about its axis by a hemispherical shell 118 also containing bevel gears 119 and 120. However, gear 120 has no mechanical coupling with any part in capsule A and thus merely idles during travel of the vehicle. In short, the vehicle is driven by and through axle 108 only. All four wheels such as 111 are identical and have flanged rims to accomodate a pair of flexible driving bands 89. Thus in the assembly one band 89 passes over and about wheels 111 and 123 and the other band extends similarly about the forward and rearward wheels at the other side. In this way the vehicle may be propelled forwardly or rearwardly when motor 67 is energized to rotate in the corresponding direction.

It will be noted that in FIG. 17 band 89 also is shown as a tire tread upon FIG. 16. This is due to the fact that the ratio of the diameters of wheels 88 and 111, for example, are related to the distance between the two axles 108 and 117a of FIG. 17, so that bands 89 may be used in both assemblies.

As shown by FIG. 17 the top projection of capsule D journals a shaft 122 having a crown gear 124 fixed to its lower end, and a coupling like 41, FIG. 8, attached to its upper end, for driving engagement with a windlass 125. Crown gear 124 is in mesh with worm shaft 113 so that in an obvious way, energization of the motor slowly rotates the windlass and winds a cord or chain 126 thereabout. This passes over a pulley in housing 127, over and along a cantilever 128, a pulley 129 from which it depends to terminate in a hook or like device 130. Thus the hook may be used to lift small objects in simulation of the operation of a crane. It is noted that part 127 simulating a crane housing has a downwardly-extending projection fitting a sleeve 14 and is thus firmly mounted on and supported by capsule B. The two leads 101 and 103 extend from battery housing 98 to switch box 129. Housing 98 is mounted by two of its axially-spaced projections and two sleeves, to correspondingly-spaced projections formed by capsules A and B, respectively. Two additional leads 131, 132 extend from box 129 to terminals 70 and 71 (FIG. 12) of the motor in capsule A so that the motor may be controlled by a toggle switch not shown forming a part of the switch box assembly. In fact box 129 is equipped with two toggle switches, one being an on-off item and the other a reversing switch so that the motor may be energized for rotation in either direction. As such controlling and reversing circuitry is well known it is not necessary to show and describe it in detail.

While an assembly of parts as described in connection with FIGS. 16 and 17 may be also made up into a large number of operating combinations of various types, other adjuncts may be provided in a complete set. These may include water propellers and paddle wheels where a floating model is constructed, or air propellers when a model is to be thus propelled. Also a small hydraulic pump may be added as well as a lamp attachment for use in conjuction with the flasher of FIG. 13. Centrally-apertured paddle wheels may be provided, mounted similarly to wheels 87, 88, FIG. 16, in place thereof, and driven by motor 67. In such models floats like 83, FIG. 14 may be used to support the model in such a way that the paddle wheels dip into the supporting liquid.

Figure 18:
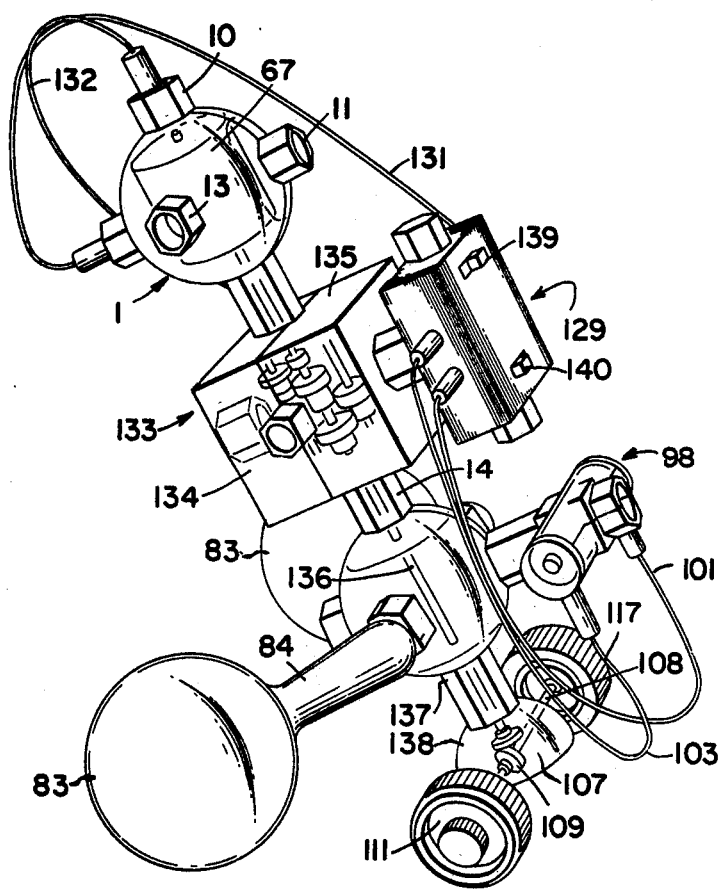
FIG. 18 is a perspective vew of an assembly of modules or capsules forming an upright wheel-supported vehicle generally suggestive of a human being.

Referring to FIG. 18 there is shown another of the many possible instructive combinations of component parts which the invention makes possible. In this figure a central capsule of cubical form is identified at 133. This capsule, except for its external form, may be like that depicted at FIGS. 1 and 2. That is, it is constructed of two essentially identical halves 134 with meeting edges held in smooth registration by cooperating integral projections such as 3 and 9, FIGS. 1 and 2 and which in the mating positions of the halves conjointly define a protrusion octagonal in external shape and over and about which fits a sleeve which may be identical with item 14, FIG. 4, to thus separably unite the halves.

Capsule 133 is shown as containing reduction gearing like that depicted at FIG. 10 and with its input coupling 4 connected to the shaft of a driving motor 67 (see also FIG. 12), mounted within a capsule 1 of spherical form as in FIGS. 1 and 2. In a way obvious from previous descriptions of FIGS. 10, 12 and 14, the output shaft of the reduction gearing in capsule 133 and which corresponds to coupler 41, FIG. 10, is connected with and drives a shaft 136 passing directly through capsule 137 to a bevel gear assembly within a hemisphere or shell 107. See also FIG. 17. Since the final drive may be identical with the parts previously described in connection with FIG. 17, it is sufficient to identify bevel gear 109 in mesh with gear 138, shaft 108 and ground-engaging driving wheels 111, 117, both detachably connected to the respective ends thereof as in FIG. 17. Battery box 98 (see also FIG. 16) switch box 129 (see FIG. 17) and electrical leads 101, 103, 131 and 132, enable control of motor 67. FIG. 18 also shows the two toggle switches 139, 140 of box 129, previously described in connection with FIG. 17, by which energization of the motor and its direction of rotation are respectively controlled.

FIG. 18 also shows a pair of bulbous floats 83 detachably connected with capsule 137, as previously described in connection with FIG. 14.

Thus, energization of motor 67 in one direction or the other, effects rotation of wheels 111 and 117 at greatly reduced speed and propels the assembly in the corresponding direction.

Figure 19:
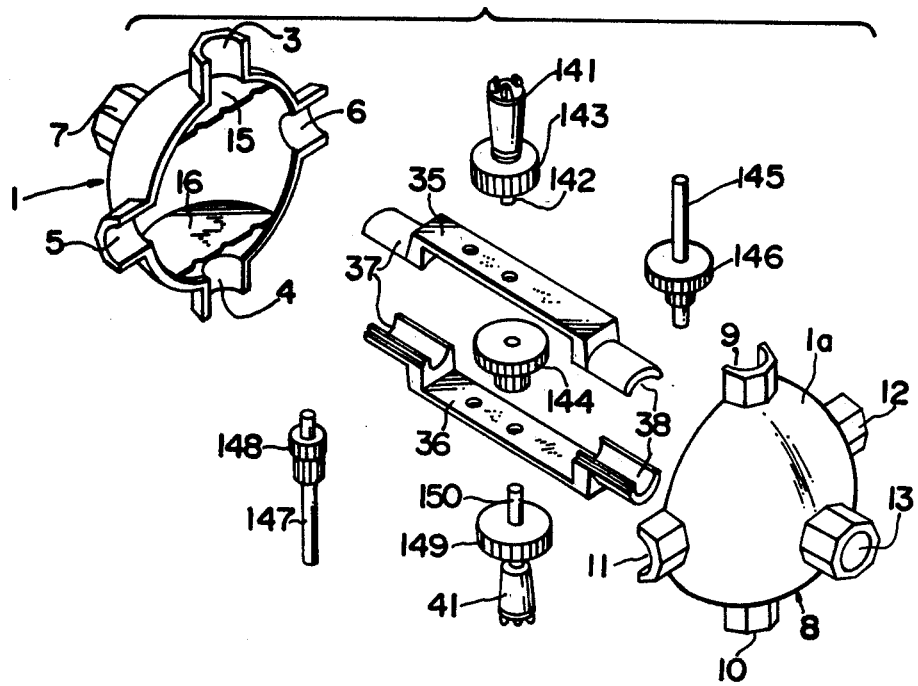
FIG. 19 is an exploded view of a capsule enclosing reduction gearing with couplings enabling operative connection of parts of contiguous capsules attached thereto.
Figure 20:
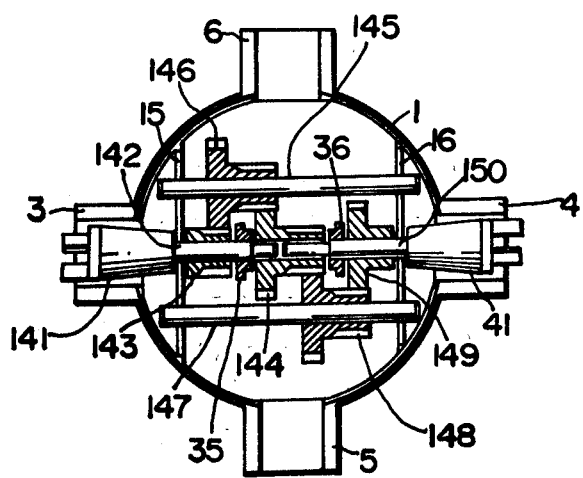
FIG. 20 is a diametral section of the capsule of FIG. 19, with elements thereof completely and operatively assembled.

FIGS. 19 and 20 depict in greater detail the construction of reduction gearing in and mounted by a capsule which in this case is spherical and may be a duplicate of the one shown at FIGS. 1 and 2 so that it is sufficient to identify hemisphere 1 with its projections 3 through 7 and semicircular disks 15 and 16, and hemisphere 8 with its projections 9 to 13. As previously described in connection with FIG. 6, the interior frame is composed of identical and separable halves 35, 36 which when assembled conjointly form at their ends, hollow trunnions 37 and 38 each adapted for a smooth rotational fit in the respective tubular projections 7 and 13.

Input coupler 141, FIGS. 19 and 20, is journaled at one end in the bore conjointly formed by the projections 3 and 9. Its shaft 142 has pinion 143 fixed thereon. The shaft passes with a smooth fit through a bearing hole in the side 35 of frame 34 and has a reduced end smoothly fitting the bearing bore in idler gear 144, which, as shown, has portions of greater and lesser pitch diameters. Jackshaft 145 has its ends journaled in bearing holes conjointly formed by the registering notches in the two disks 15 and 16 when halves 1 and 8 are joined to constitute a sphere. This shaft has a gear 146 fixed thereon. The gear is formed with two integral toothed portions of greater and lesser pitch diameters, noting FIG. 20. The portion of greater size meshes with pinion 143 while that of lesser size meshes with the portion of greater pitch diameter of gear 144.

A second jackshaft 147 is journaled at its ends in second bearing holes formed by the registering notches in the metering edges of disks 15, 16, and has fixed thereon a gear 148 which may be a duplicate of gear 146 and having first and second integral toothed portions of different pitch diameters in mesh, respectively, with the portion of smaller diameter of gear 144 and an output gear 149 fixed to output shaft 150. As is clear from inspection of FIG. 20, this shaft is journaled at its inner end in a bearing hole in frame part 36. Its reduced inner end has a smooth fit in the axial bore of idler 144 and thus assists in rotatably mounting it. Shaft 150 at its outer end is journaled by coupling 41 in the way previously described for shaft 42, FIG. 6. Thus a drive of greatly reduced speed is established from input coupler 141, shaft 142, pinion 143, gears 146, 144, 148 and 149, to putput member 41.

Assembly is a simple operation. Gear 144 is emplaced between frame parts 35, 36, assembled as in FIG. 6. Shafts 142 and 150 are moved through aligned central bearing holes in the frame parts until their ends are seated in the axial bearing hole in gear 144. One trunnion such as 38 conjointly formed by the frame parts is then inserted into the bearing hole formed by the integral projection of hemisphere 8, such as 13, FIG. 6, so that couplers 41, 141 rest in projections 10, 9, and shafts 142, 150 rest in center notches in disks 15, 16. Then the other hemispherical half 1 is moved down over the hemisphere 8, so that trunnion 37 fits the bearing hole in projection 7. A pair of sleeves 14 are then moved over the separable projection halves 3, 9 and 4, 10 to thus hold the assembled parts in operative relation.

Figure 21:
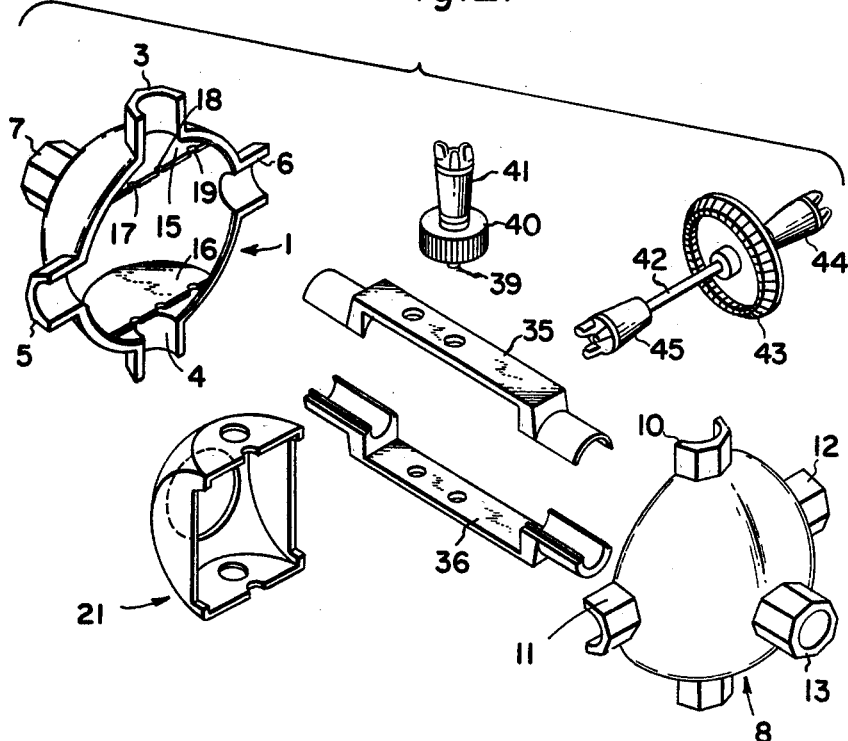
FIG. 21 is an exploded view similar to FIG. 19 but showing parts which may be assembled into a module to form bevel gearing.
Figure 22:
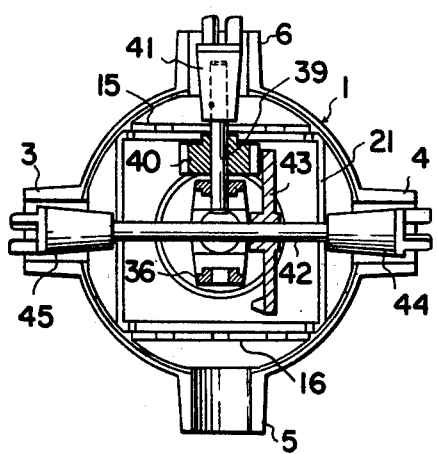
FIG. 22 is a diametral section of the capsule of FIG. 21, with gears operatively assembled therein.

FIGS. 21 and 22 show in greater detail a bevel gear assembly similar to that of FIG. 6. As this assembly and its operation have been previously described it is deemed sufficient to identify hemispheres 1 and 8, disks 15, 16 and their three bearing notches 17, 18, 19, cage 21, shaft 42 with crown gear 43 fixed thereon and couplers 44, 45 fixed to its respective ends, each journaled in the meeting halves of projections 6, 12 and 5, 11. Gear 43 meshes with pinion 40 fixed on shaft 39 having its inner end journaled in the central hole of frame part 35. FIG. 22 shows how shaft 42 rests in the central notches in cage 21 and is thus prevented from play in the axial direction by the confronting end surfaces of couplers 44 and 45.

Figure 23:
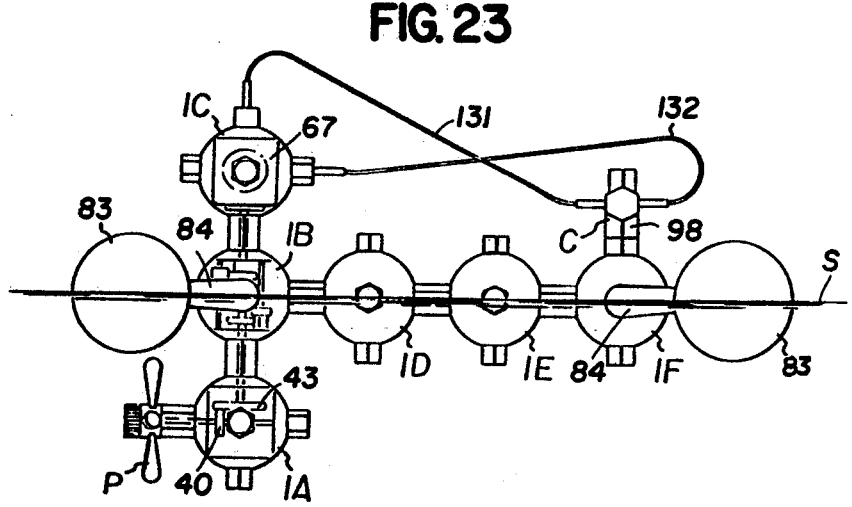
FIG. 23 shows in vertical elevation a number of capsules interattached, with floats, and adapted to be driven by a propeller.

FIG. 23 shows in side elevation an assembly wherein four capsules 1B, 1D, 1E and 1F are interconnected in horizontal alignment. Capsule 1B has a pair of capsules 1A and 1C connected in vertical alignment at right angles to the line of connection of capsules 1B, 1D, etc. Capsule 1C contains a motor such as 67, FIG. 12, supplied with current over leads 131, 132, from dry cells in housing 98, as previously described, and detachably supported by capsule 1F. The output shaft of motor 67 is coupled to gearing in capsule 1B to reduce the speed thereof. The output coupling of 1B is connected to the input of a gear assembly as shown upon FIGS. 6, 21 and 22, to drive crown gear 43 and pinion 40, in turn connected to a propeller P. The assembly is supported by forward and rearward pairs of floats like those identified at 83, FIG. 14. The forward pair is attached by necks 84 to capsule 1F. The rearward pair is attached to capsule 1B. It will be understood that the second float of each pair does not appear upon FIG. 23.

Thus the assembly is supported by floats 83 on the surface of liquid indicated at S, so that when motor 67 is energized, propeller P is rotated and the device is propelled in the direction of the axis of connected capsules 1B to 1F.

Figure 24:
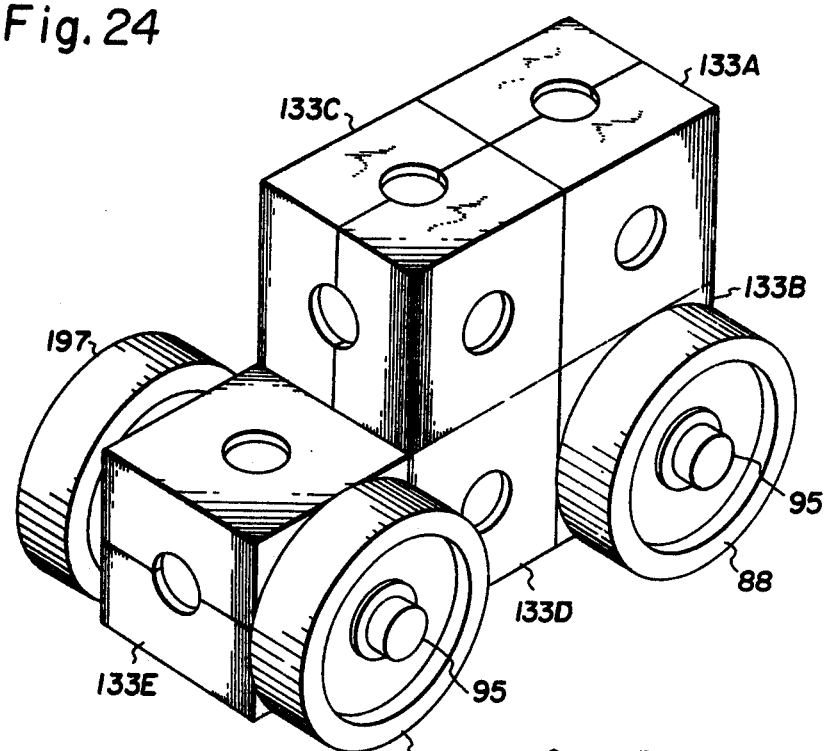
FIG. 24 is a perspective view of a modified form of wheel-supported assembly wherein the capsules are cubical in form.
Figure 25:
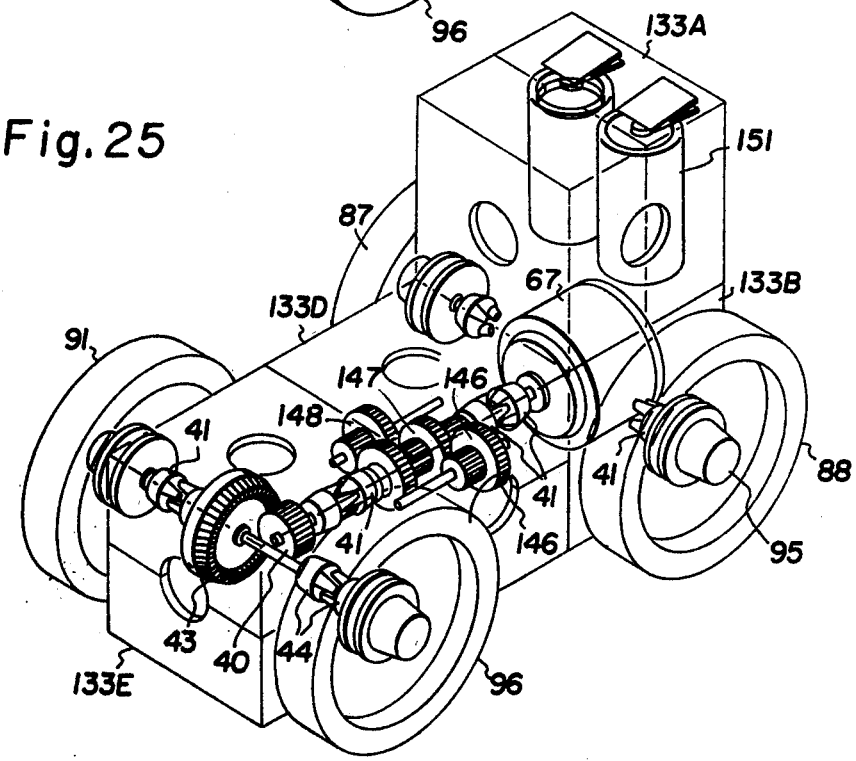
FIG. 25 is a perspective view of a modified vehicle as in FIG. 24, showing in phantom the motor and power-driven reduction gearing by which a pair of the ground-engaging wheels are rotated.

FIGS. 24 and 25 show a number of cubical capsules 133A, 133B, etc., similar to item 133, FIG. 18, and interconnected to form a motor-propelled, four-wheel vehicle. Although for clarity of illustration the cubical capsules of these figures have been shown without projections such as are shown for capsule 133, FIG. 18, as will be explained in connection with FIG. 26, these cubical capsules may be detachably united or connected by essentially the same projections and sleeves as have been previously described in connection with, for instance, FIGS. 1, 2 and 18, as will be subsequently described in connection with FIG. 26.

Apart from the cubical capsules of FIGS. 24 and 25, the self-propelled vehicle is essentially like the one previously described in connection with FIG. 16, so that it is believed sufficient to identify wheels 87, 88, 96 and 97, the latter two being power driven from a motor 67 in capsule 133B. Wheels 87, 88 are journaled on this capsule in the manner set forth in connection with FIG. 16, and held in place by retaining nuts such as 95. Capsule 133D contains reduction gearing which may be like that of FIG. 10. Its output coupling 41 is connected to drive bevel gearing in capsule 133E. This bevel gearing may be of the same construction as has been described in connection with FIG. 22 so that it is sufficient to identify pinion 40, ring gear 43. In these figures capsule 133A, mounted atop motor-containing capsule 133B, contains dry cells 151 connected by wiring not shown, to motor 67. Capsule 133C, FIG. 24, has been omitted from FIG. 25, to enhance clarity of illustration.

Figure 26:
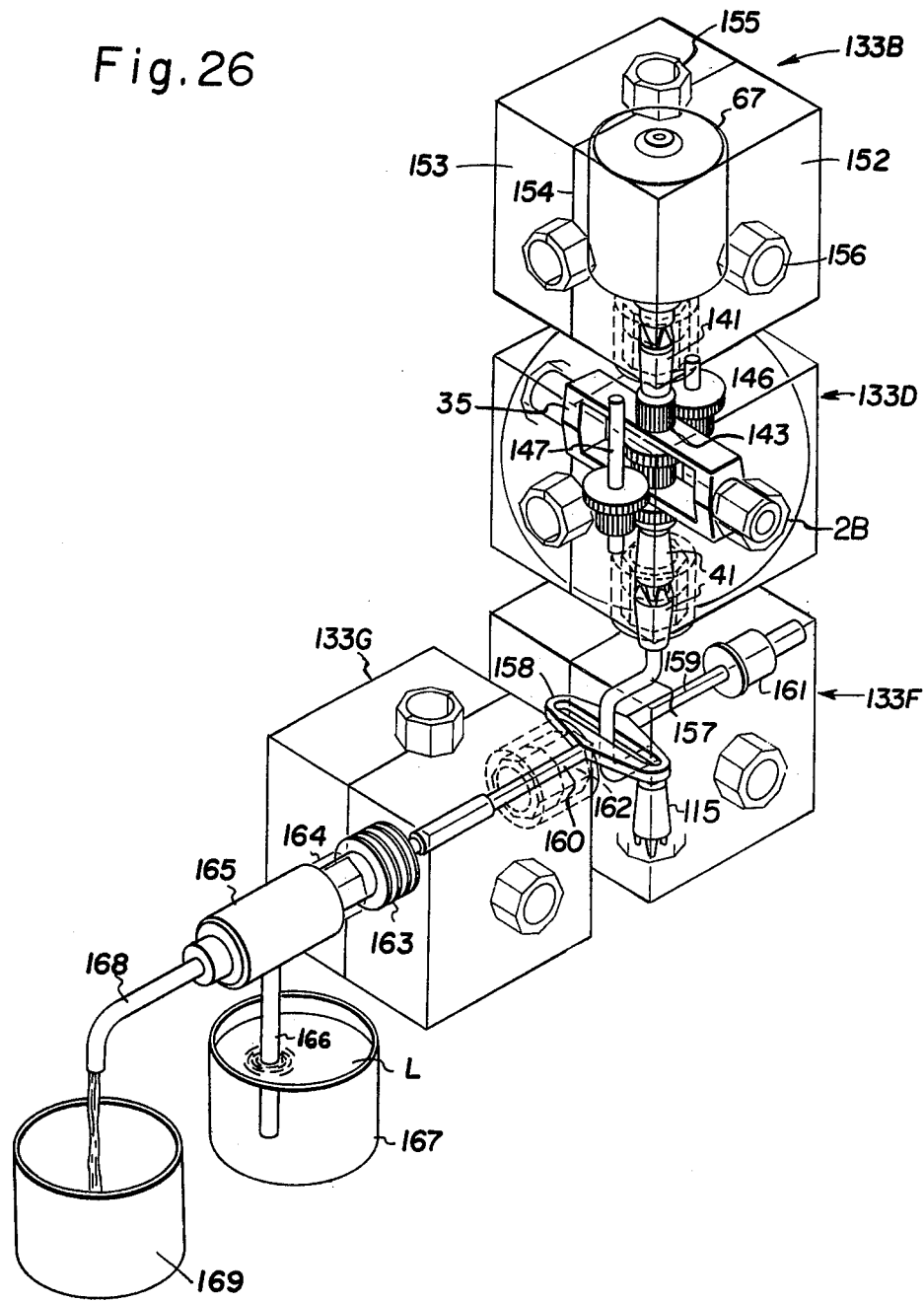
FIG. 26 is a perspective view of a number of interconnected capsules of cubical form and showing an assembly forming a motor-driven pump.

FIG. 26 shows a very interesting and instructive assembly of cubical capsules forming a motor-driven fluid pump. This figure also illustrates the detachable connections between capsules. Thus, upper capsule 133B encloses and mounts motor 67. As all capsules of this figure are alike it is deemed sufficient to identify two substantially identical halves 152, 153. The halves are separable along a central plane indicated by line 154. As in the case of hemispherical halves, items 152, 153 have four integral semicylindrical projections and which in the assembled relation conjointly define four complete cylindrical and tubular projections such as the one indicated at 155. Similarly each half has a single integral complete projection such as is identified at 156.

Capsule 133D is located immediately below capsule 133B and as in the assembly of FIG. 25, contains reduction gearing like that previously described in connection with FIG. 20. The input coupling of this gearing is connected with the shaft of motor 67 and drives at greatly reduced speed, through couplers 41, a crank 157 journaled in capsule 133F by upper and lower bearings in the same way as shaft 42, FIG. 22. The crank passes through the slot of a yoke 158 carried by axially-aligned shaft portions 159, 160 which are mounted for reciprocation as a unit with the yoke, in bearings 161, 162, so that in a way obvious from FIG. 26, energization of motor 67 effects relatively slow reciprocation of yoke 158 and its shaft portions.

Shaft portion 160 extends to the exterior of capsule 133F and into capsule 133G where its end is coupled to a bellows device 163 so that in response to reciprocation of yoke 158, super- and subatmospheric pressures are alternately induced therein. The outer end of the bellows is connected by tubular element 164 to a conventional valve 165 with supply or suction pipe 166 extending downwardly into liquid L in tank 167. Delivery pipe 168 extends from valve 165 into tank 169. Thus in a way obvious from inspection of FIG. 26, reciprocation of yoke 158 draws liquid in pulses from tank 167 and delivers it into tank 169. It will be understood that in the form of the invention shown upon this figure, the two separable halves of each capsule are held together by sleeves which may be identical with item 14, FIG. 4, as is depicted for capsule 133, FIG. 18. Such sleeves are shown in dotted lines connecting capsules 133B and 133D, 133D and 133F, and 133F and 133G, but are otherwise omitted to avoid unnecessary and possibly confusing detail.

Spherical, rectangular or other shapes of polygonal capsules provided with the same mating connections are usable according to the invention, separately or in combinations, for various functions of produced models, adding other functions to existing models and placing existing models in practical use.

Cleaning of the inside of the capsule may be readily effected at the time of disassembling and reassembling of the capsules. The capsules enable experiments or observations to be carried out with capsules and/or capsule couplers filled, for example, with gas or liquid, or in some cases with solids, and the capsule may be used as the simulator of an information transmission system. Alternatively, the capsules may be used for environmental testing of animals and plants under different environments utilizing many capsules or spaces between capsules, may be used for display or exhibition, or may be used to determine, for instance, the variety or combinations of complementary colors of decorations by means of coloring or flashing electric lamps.

One of the great advantages of the invention is its versatility because by using a relatively small number of parts or components, a very great number of mechanically operating models may be built up. In fact the number of such devices is limited only by the imagination of the user; and thus children as well as adults are encouraged to exercise and develop skill and ingenuity in devising instructive, useful and entertaining combinations of operating parts.

While a generally spherical form for the capsules is preferred due to ease of fabrication and economical use of plastic, they may be made in the shape of polyhedrons other than cubical if such shapes should be preferred. Hence the invention is not to be interpreted as limited to a spherical form of capsule.

I claim:

1. In an educational and amusement construction type assembly, first and second hollow substantially identical halves forming a generally symmetrical hollow capsule having a polar diameter and an equatorial plane intersecting the mid-point of said polar diameter, normal thereto, said halves having contacting peripheral edges lying in said equatorial plane, and first and second tubular projections extending radially outwardly from said capsule at the respective ends of a first diameter in said equatorial plane, each said projection being formed by matching semi-cylindrical tubular portions each integral with a respective one of said halves and having contacting edge surfaces lying in said equatorial plane.

2. The assembly of claim 1, and third and fourth tubular projections extending radially outwardly therefrom at the respective ends of a second diameter in said equatorial plane, normal to said first diameter, each of said third and fourth projections being formed by matching semi-cylindrical tubular portions each integral with a respective one of said halves and having contacting edge surfaces lying in said equatorial plane, each said projection being symmetrical about its respective diameter.

3. The assembly of claim 2, and fifth and sixth tubular projections each integral with a respective one of said halves and extending radially outwardly therefrom at the respective ends of said polar diameter, all said projections having identical sections in planes normal to their respective diameters.

4. The assembly of claim 3, each said tubular projection forming a cylindrical bore coaxial of its respective one of said first, second and polar diameters.

5. The assembly of claim 3, said capsule being in the form of two separable hemispheres with mating edges on each material plane, said first, second, third and fourth projections being in the form each of two discrete semicylinders with meeting edges in said plane, and an open frame in said capsule and having trunnions journalled in said fifth and sixth projections, respectively for pivoting about said third diameter, a gear fixed to said first shaft, a second shaft having its ends journalled in said third projection and said frame respectively and in mesh with said first gear, and a third pronged coupling fixing to the outer end of said second shaft.

6. The assembly of claim 3, said capsule being in the form of two separable hemispheres with meeting edges in said equatorial plane, said first, second, third and fourth projections being in the form of two discrete semicylinders with meeting edges in said plane, an open frame in said capsule and having trunnions journaled in said fifth and sixth projections, respectively, for pivoting about said polar diameter, a first shaft journaled by and between said first and second projections, a gear fixed to said first shaft, a second shaft having its ends journaled in said third projection and said frame, respectively, and in mesh with said first gear, and a third pronged coupling fixed to the outer end of said second shaft.

7. The capsule of claim 6, pronged couplings fixed to the respective ends of said first shaft and journaling the same in said first and second projections, a gear fixed to said first shaft, a second shaft having its ends journaled in said third projection and said frame, respectively, and a pinion fixed to said second shaft and in mesh with said gear.

8. The assembly of claim 3, said transverse sections being a regular octagon, said first and second, third and fourth, fith and sixth projections forming three respective pairs, each pair being symmetrical about a respective one of said first, second and polar diameters, the octagonal sections of all said projections being oriented the same, each with respect to and about its own one of said first, second and polar diameters.

9. The assembly of claim 8, said capsule and projections being of clear pellucid plastic.

10. The assembly of claim 9, said plastic being selected from the group consisting of polycarbonate, polyethylene, polypropylene and methyl methacrylate.

11. The assembly of claim 1, said symmetrical hollow capsule being substantially spherical.

12. The assembly of claim 1, said symmetrical hollow capsule being substantially polygonal.

13. The assembly of claim 1, said capsule being in the form of two separable hemispheres, said contacting peripheral edges being reciprocally rabbetted for interlock.

14. The assembly of claim 13, and an electric motor having a casing fixedly positioned in said capsule and with its rotor shaft coaxial of and extending along the axis of said first and second projections.

15. The assembly of claim 14, a coupling fixed to one end of said motor shaft and extending into said first projection, and a plurality of prongs fixed with the outer face of said coupling and extending axially thereof, the base of said prongs being within said first projection, said prongs extending in part exteriorly of said first projection.

16. The capsule of claim 15, a pair of cylindrical contact elements secured in said second and third projection respectively and having exposed plug-in sockets, each electrically connected with the circuit of said motor to supply current thereto from an external source.

17. The assembly of claim 1, and a sleeve having a central longitudinal axis of symmetry and polygonal in internal transverse section, one end thereof fitting over and about any selected one of said projections.

18. The capsule of claim 17, and a second like assembly having one projection thereof fitting the other end of said sleeve to firmly unite said capsules in fixed relative angular relation about their common axis and the axis of said sleeve.

19. The assembly of claim 18, and an electric motor having a casing fixedly positioned in said second capsule and with its rotor shaft coaxial of and extending along the axis of said selected first projection and said second projection.

20. The assembly of claim 19, a first shaft, pronged couplings fixed to the respective ends of said first shaft and journalling the same in said first and second projections, a gear fixed to said first shaft, a second shaft having its ends journalled in said third projection and said frame, respectively, and a pinion fixed to said second shaft and in mesh with said gear.

21. The assembly of claim 19, a coupling fixed to one end of said motor shaft and extending into said first projection, and a plurality of prongs fixed with the outer face of said coupling and extending axially thereof, the base of said prongs being within said first projection, said prongs extending in part exteriorly of said first projection.

22. The assembly of claim 21, cylindrical contact elements secured in said second and third projections, respectively, and having exposed plug in sockets, each electrically connected with the circuit of said motor to supply current thereto from an external source.

23. In a construction type educational and amusement assembly, a plurality of like capsules of regular geometrical form, each comprising first and second identical mating halves and having a polar diameter, an equatorial plane normal to and intersecting the mid-point of said diameter, and contacting peripheral edges disposed in said plane, each said half having first and second semicylindrical projections fixed therewith and extending radially outwardly therefrom at the respective ends of a first diameter in said equatorial plane, each said projection of one half mating with a corresponding projection of the other half to conjointly form a short, open-ended tubular coupling element communicating with the interior of its capsule, and a plurality of tubular connecting sleeves each adapted to receive in its respective ends and with a smooth fit, a pair of said coupling elements of contiguous capsules, to separably and firmly connect the same into a unitary assembly.

24. The assembly of claim 23, each said coupling element being polygonal in exterior section transverse to said first diameter, each said connecting sleeve being of like polygonal internal cross section, to thereby non-rotatably unite contiguous capsules.

25. The assembly of claim 24, the transverse polygonal section of each said coupling element being of regular octagonal form.

26. The assembly of claim 25, the octagonal cross section of each said coupling element being rotationally disposed about its said first diameter, with two diametrally opposite apices in a plane through their common axis, normal to said equatorial plane and passing through said polar diameter.

27. The assembly of claim 23, an operative machine part mounted in each said capsule and including a shaft having a bearing in its said coupling element and an end portion projecting exteriorly therefrom, and coupling means fixed with each said end portion and interengaging with the coupling means of the next contiguous capsule, to thereby interconnect said shafts for rotation in synchronism.

28. The assembly of claim 23, each said first and second halves having a complete tubular projection extending radially therefrom in symmetry about and extending along said polar axis, a float having a tubular neck integral therewith and extending outwardly therefrom, said neck terminating in an internal recess fitting smoothly over and about any selected one of said tubular projections.

* * * * *